United States Patent
Hazrati et al.

(10) Patent No.: US 11,255,693 B2
(45) Date of Patent: Feb. 22, 2022

(54) TECHNOLOGIES FOR INTELLIGENT TRAFFIC OPTIMIZATION WITH HIGH-DEFINITION MAPS

(71) Applicant: Intel Corporation, Santa Clara, CA (US)

(72) Inventors: Mehrnaz Khodam Hazrati, San Jose, CA (US); Ignacio Alvarez, Portland, OR (US); Domingo Gonzalez, San Jose, CA (US); Christopher Lopez-Araiza, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 16/370,986

(22) Filed: Mar. 30, 2019

(65) Prior Publication Data
US 2019/0226868 A1 Jul. 25, 2019

(51) Int. Cl.
*G01C 21/36* (2006.01)
*H04L 67/12* (2022.01)
*H04L 47/10* (2022.01)
*G08G 1/01* (2006.01)
*G05D 1/02* (2020.01)
*H04L 43/045* (2022.01)

(52) U.S. Cl.
CPC ....... *G01C 21/3691* (2013.01); *G05D 1/0276* (2013.01); *G08G 1/0116* (2013.01); *G08G 1/0141* (2013.01); *H04L 43/045* (2013.01); *H04L 47/10* (2013.01); *H04L 67/12* (2013.01); *G05D 2201/0213* (2013.01)

(58) Field of Classification Search
CPC ............. G01C 21/3691; G05D 1/0276; G05D 2201/0213; G08G 1/0116; G08G 1/0141; H04L 43/045; H04L 47/10; H04L 67/12
See application file for complete search history.

(56) References Cited

U.S. PATENT DOCUMENTS

| 10,410,352 B1* | 9/2019 | Kim ..................... G06K 9/6262 |
| 2011/0113155 A1* | 5/2011 | Kuznetsov .......... G01C 21/3446 709/241 |
| 2011/0125583 A1* | 5/2011 | Hao .................... G01C 21/3492 705/14.64 |
| 2018/0211427 A1* | 7/2018 | Andrew .................. G06T 11/00 |
| 2018/0224294 A1* | 8/2018 | Hao ....................... H04W 4/023 |
| 2018/0365994 A1* | 12/2018 | Song .................... G05D 1/0223 |

* cited by examiner

*Primary Examiner* — Ramsey Refai
(74) *Attorney, Agent, or Firm* — Alliance IP, LLC

(57) ABSTRACT

Technologies for intelligent traffic optimization include a directional flow server that receives dynamic traffic data from traffic infrastructure devices in a monitored region. The traffic data may include traffic volume data and traffic control status data. The server updates a dynamic layer of a high-definition map based on the dynamic traffic data. The high-definition map also includes a static layer and a directional flow layer. The server optimizes the directional flow in response to updating the dynamic layer. The directional flow layer is indicative of traffic direction associated with roads in the monitored region. The server may optimize each of several sub-regions and then optimize connection roads between the regions. The server may distribute the optimized directional flow layer to consumers such as traffic control devices, autonomous vehicles, and other subscribing devices. Other embodiments are described and claimed.

25 Claims, 5 Drawing Sheets

TECHNOLOGIES FOR INTELLIGENT TRAFFIC OPTIMIZATION WITH HIGH-DEFINITION MAPS

BACKGROUND

An autonomous vehicle is a vehicle capable of sensing a surrounding environment and navigating through the environment to reach a predetermined destination, typically without further input from a vehicle operator. To do so, the autonomous vehicle includes various sensors, such as lasers, radar, global positioning system (GPS), and computer vision technologies, to facilitate navigation. A vehicle control system incorporated within the autonomous vehicle may process the sensor data to identify appropriate navigation paths, obstacles, relevant signage, and other navigational data. Of course, some "autonomous" vehicles may be semi-autonomous and require operator input, confirmation, and/or oversight.

High Definition (HD) maps are highly precise maps (e.g., accurate to the centimeter-level) used by autonomous vehicles to support navigation of the vehicle. HD maps differ from typical navigation maps designed for vehicle operator viewing. For example, HD maps are more precise, have multiple layers of information, and may not be configured for visual display.

HD maps are typically provided to an autonomous vehicle by an HD map provider and communicated as tiles, which include navigation information for a particular area. However, many HD map providers utilize proprietary HD map solutions such that the HD maps are not interoperable across different HD map solutions and/or vehicle manufacturers. As such, autonomous vehicles cannot utilize HD maps from a non-subscribed HD map provider, which can result in a lack of HD map tiles for certain areas as different HD map providers may cover different areas. Additionally, the proprietary HD mapping solutions create difficulties in crowdsourcing HD maps as the protocol of communicating such data may be unknown to non-subscribed autonomous vehicles. Furthermore, the quality-of-service requirements may differ between HD map providers, which can create further difficulties in sharing HD maps and information.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
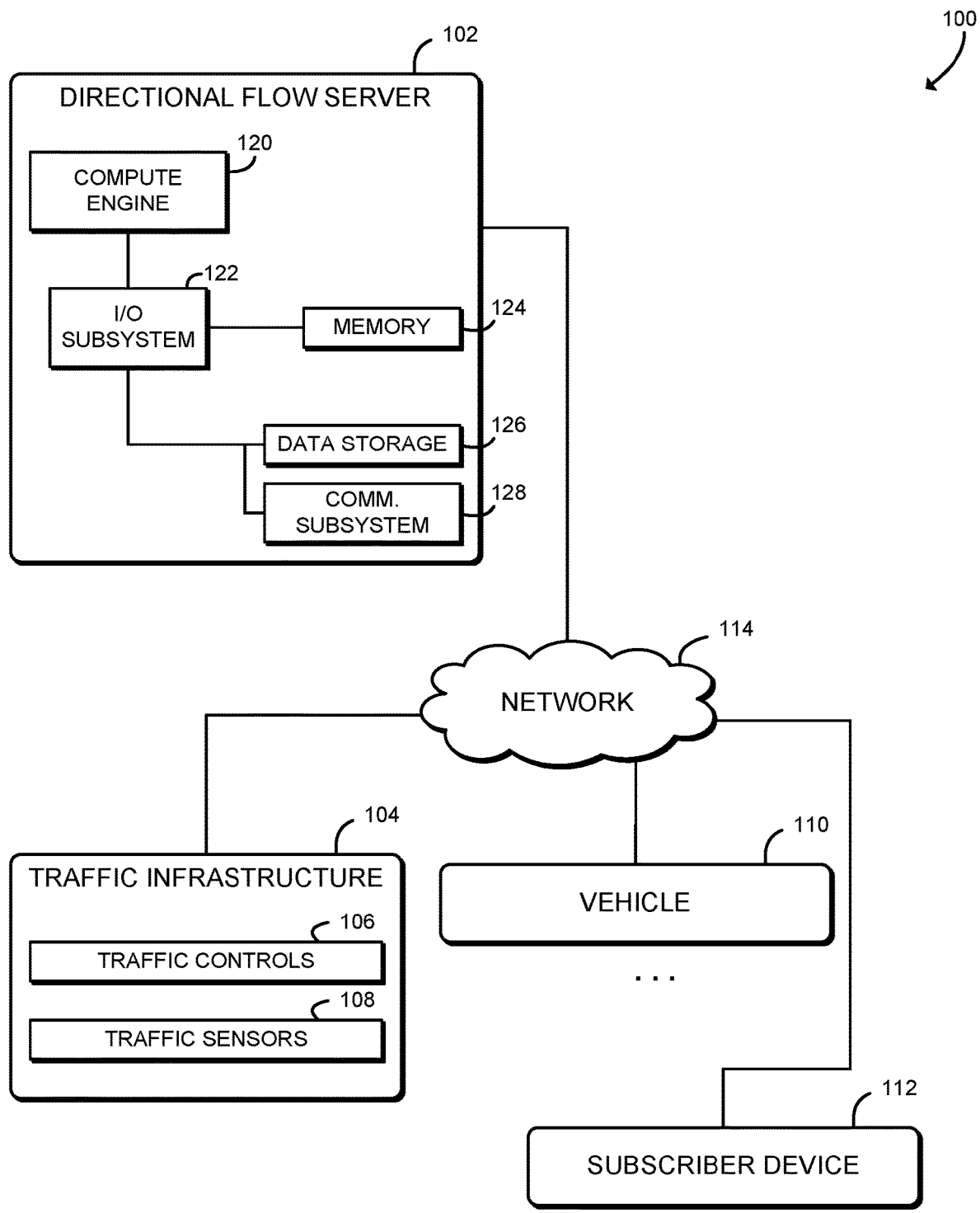
FIG. 1 is a simplified block diagram of at least one embodiment of a system for intelligent traffic optimization.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require a preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

Referring now to FIG. 1, a system 100 for intelligent traffic optimization is shown. In use, as described further below, a traffic infrastructure 104 collects real-time, dynamic data on vehicle traffic in a monitored region, including traffic volume and traffic control status. A directional flow server 102 receives the dynamic data and optimizes the direction and flow of traffic in the monitored region based on dynamic conditions. The optimized data may be processed as a layer of high-definition (HD) map data. The directional flow server 102 may distribute the optimized HD map data to the traffic infrastructure 104 and to multiple autonomous vehicles 110 in the monitored region. The traffic infrastructure 104 and the vehicles 110 may implement the optimized HD map data, for example by modifying the status of traffic control devices and/or vehicle navigation systems to change the direction and/or volume of traffic that flows on various streets in the monitored region. The directional flow server 102 may also distribute the optimized HD map data to other subscriber devices 112. Thus, the system 100 may allow cities or other regions to more efficiently manage traffic flows and to adapt dynamic traffic routing. The system 100 may also allow cities to provide optimized information back to autonomous vehicles, which may offer a desirable method of redundancy to autonomous vehicles.

The directional flow server 102 may be embodied as any type of device capable of performing the functions described herein. For example, the directional flow server 102 may be embodied as, without limitation, a computer, a server, a workstation, a multiprocessor system, a distributed computing device, a switch, a router, a network device, a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer), and/or a consumer electronic device. Additionally or alternatively, the directional flow server 102 may be embodied as a one or more compute sleds, memory sleds, or other racks, sleds, computing chassis, or other components of a physically disaggregated computing device. As shown in FIG. 1, the illustrative directional flow server 102 includes a compute engine 120, an I/O subsystem 122, a memory 124, a data storage device 126, and a communication subsystem 128. Additionally, in some embodiments, one or more of the illustrative components may be incorporated in, or otherwise form a portion of, another component. For example, the memory 124, or portions thereof, may be incorporated in the compute engine 120 in some embodiments.

The compute engine 120 may be embodied as any type of compute engine capable of performing the functions described herein. For example, the compute engine 120 may be embodied as a single or multi-core processor(s), digital signal processor, microcontroller, field-programmable gate array (FPGA), or other configurable circuitry, application-specific integrated circuit (ASIC), or other processor or processing/controlling circuit or virtualized version thereof. Similarly, the memory 124 may be embodied as any type of volatile or non-volatile memory or data storage capable of performing the functions described herein. In operation, the memory 124 may store various data and software used during operation of the directional flow server 102 such as operating systems, applications, programs, libraries, and drivers. As shown, the memory 124 may be communicatively coupled to the compute engine 120 via the I/O subsystem 122, which may be embodied as circuitry and/or components to facilitate input/output operations with the compute engine 120, the memory 124, and other components of the directional flow server 102. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 124 may be directly coupled to the compute engine 120, for example via an integrated memory controller hub. Additionally, in some embodiments, the I/O subsystem 122 may form a portion of a system-on-a-chip (SoC) and be incorporated, along with the compute engine 120, the memory 124, the accelerator 130, and/or other components of the directional flow server 102, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The communications subsystem 128 may be embodied as any communication circuit, device, or collection thereof, capable of enabling communications between the directional flow server 102 and other remote devices over the network 114. The communications subsystem 128 may be configured to use any one or more communication technology (e.g., wired or wireless communications) and associated protocols (e.g., Ethernet, Bluetooth®, Wi-Fi®, WiMAX, 3G, 4G LTE, 5G, etc.) to effect such communication.

The traffic infrastructure 104 includes distributed devices that measure and control vehicle traffic in a monitored region such as a city. As shown, the illustrative traffic infrastructure 104 includes traffic controls 106 and traffic sensors 108. The traffic controls 106 may be embodied as traffic lights, lane control devices, and other devices that control the direction and/or volume of vehicle traffic on lanes of the streets, roads, or other thoroughfares in the monitored region. The traffic sensors 108 may be embodied as any sensor that monitors the current volume of vehicle traffic on the streets, roads, or other thoroughfares in the monitored region, such as traffic cameras, vehicle detection loops, proximity sensors, motion sensors, and/or other sensors. Each traffic infrastructure 104 device may be embodied as or otherwise include an Internet of Things (IoT) sensor, an IoT gateway, and/or other computational components to enable communication with remote devices over the network 114, such as the directional flow server 102. As such, each traffic infrastructure 104 device may also include components and features similar to the directional flow server 102, such as a compute engine 120, I/O subsystem 122, memory 124, data storage 126, communication subsystem 128, and/or various sensors and peripheral devices.

Each vehicle 110 may be embodied as an autonomous vehicle, semi-autonomous vehicle, vehicle with advanced navigation features, or other connected vehicle. As such, each vehicle 110 may include components and features similar to the directional flow server 102, such as a compute engine 120, I/O subsystem 122, memory 124, data storage 126, communication subsystem 128, and/or various sensors and peripheral devices. Those individual components of each vehicle 110 may be similar to the corresponding components of the directional flow server 102, the description of which is applicable to the corresponding components of the vehicle 110 and is not repeated for clarity of the present description.

Each subscriber device 112 may be embodied as any type of computation or computer device capable of performing the functions described herein, including, without limitation, a computer, a mobile computing device, a wearable computing device, a network appliance, a web appliance, a distributed computing system, an autonomous vehicle, an autonomous aerial vehicle, an Internet of Things (IoT) sensor, an IoT gateway, an industrial automation device, a processor-based system, and/or a consumer electronic device. As such, each subscriber device 112 may also include components and features similar to the directional flow server 102, such as a compute engine 120, I/O subsystem 122, memory 124, data storage 126, communication subsystem 128, and/or various sensors and peripheral devices. Those individual components of each subscriber device 112 may be similar to the corresponding components of the directional flow server 102, the description of which is applicable to the corresponding components of the subscriber device 112 and is not repeated for clarity of the present description.

As discussed in more detail below, the directional flow server 102, the traffic infrastructure 104, the vehicles 110, and the subscriber devices 112 may be configured to transmit and receive data with each other and/or other devices of the system 100 over the network 114. The network 114 may be embodied as any number of various wired and/or wireless networks, or hybrids or combinations thereof. For example, the network 114 may be embodied as, or otherwise include a mobile access network, a network edge infrastructure, a wired or wireless local area network (LAN), and/or a wired or wireless wide area network (WAN). As such, the network 114 may include any number of additional devices, such as additional base stations, access points, computers, routers, and switches, to facilitate communications among the devices of the system 100.

Figure 2:
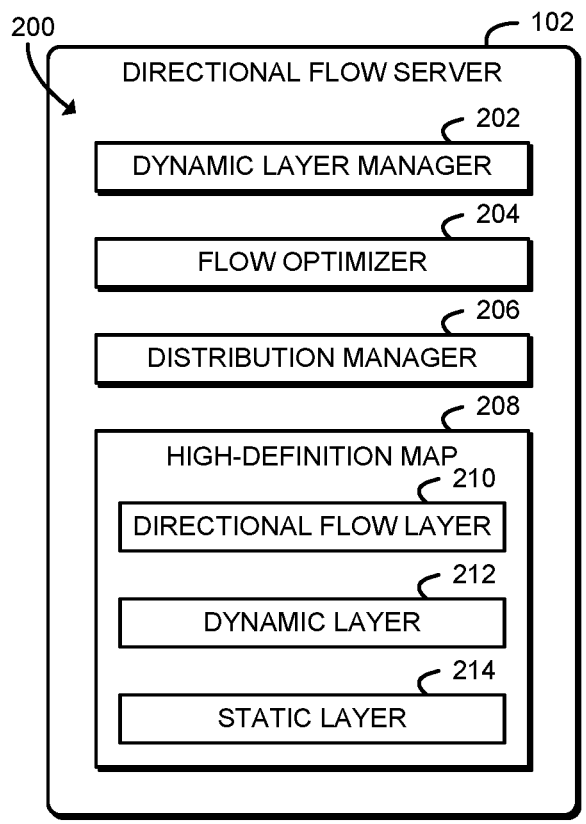
FIG. 2 is a simplified block diagram of at least one embodiment of an environment of a directional flow server of the system of FIG. 1.

Referring now to FIG. 2, in an illustrative embodiment, the directional flow server 102 establishes an environment 200 during operation. The illustrative environment 200 includes a dynamic layer manager 202, a flow optimizer 204, and a distribution manager 206. The various components of the environment 200 may be embodied as hardware, firmware, software, or a combination thereof. As such, in some embodiments, one or more of the components of the environment 200 may be embodied as circuitry or collection of electrical devices (e.g., dynamic layer manager circuitry 202, flow optimizer circuitry 204, and/or distribution manager circuitry 206). It should be appreciated that, in such embodiments, one or more of the dynamic layer manager circuitry 202, the flow optimizer circuitry 204, and/or the distribution manager circuitry 206 may form a portion of the compute engine 120, the I/O subsystem 122, the memory 124, the data storage device 126, and/or other components of the directional flow server 102. Additionally, in some embodiments, one or more of the illustrative components may form a portion of another component and/or one or more of the illustrative components may be independent of one another.

As shown in FIG. 2, the environment 200 further includes an HD map 208. The HD map 208 may be embodied as a highly precise map (e.g., accurate to the centimeter-level) of a monitored region such as a city. The HD map 208 may be used by autonomous vehicles 100 to support navigation of the vehicle 110 or for other tasks. As shown, the HD map 208 includes multiple layers of information, including a directional flow layer 210, a dynamic layer 212, and a static layer 214. The static layer 214 includes information on maps and routes in the monitored region, including specific areas in the region (e.g., nodes) and roads, streets, or other thoroughfares or routes between the areas (e.g., edges). The dynamic layer 212 includes information about traffic distributions for the nodes of the static layer 214 and may be updated in real time and recalculated based on traffic distribution across the monitored region. As described further below, the directional flow layer 210 includes the direction and/or volume of traffic for each route between nodes of the layers 212, 214. As described further below, the directional flow layer 210 may be optimized and distributed to consumers, such as the traffic infrastructure 104, the vehicles 110, and/or subscriber devices 112.

The dynamic layer manager 202 is configured to receive dynamic traffic data from multiple traffic infrastructure 104 devices from the monitored region. The dynamic traffic data may include traffic control status data from traffic control devices 106 and/or traffic volume data from traffic sensors 108. The dynamic layer manager is further configured to update the dynamic layer 212 of the HD map 208 based on the dynamic traffic data.

The flow optimizer 204 is configured to optimize the directional flow layer 210 of the HD map 208 in response to updating the dynamic layer 212. The directional flow layer 210 is indicative of a direction associated with one or more roads of the monitored region. The directional flow layer 210 may be indicative of traffic volume associated with the one or more roads of the monitored region. The directional flow layer 210 may be optimized by performing a weighted graph flow optimization algorithm. Optimizing the directional flow layer 210 may include optimizing multiple flow sublayers associated with sub-regions of the monitored region and optimizing connection roads between the sub-regions.

The distribution manager 206 is configured to send the directional flow layer 210 to multiple consumer computing devices in response to optimizing the directional flow layer 210. The consumer computing devices may include autonomous vehicles 110, traffic control devices 106, and/or subscriber devices 112. The detail level of the directional flow layer 210 may be adjusted based on an identity associated with the subscriber device 112.

Figure 3:
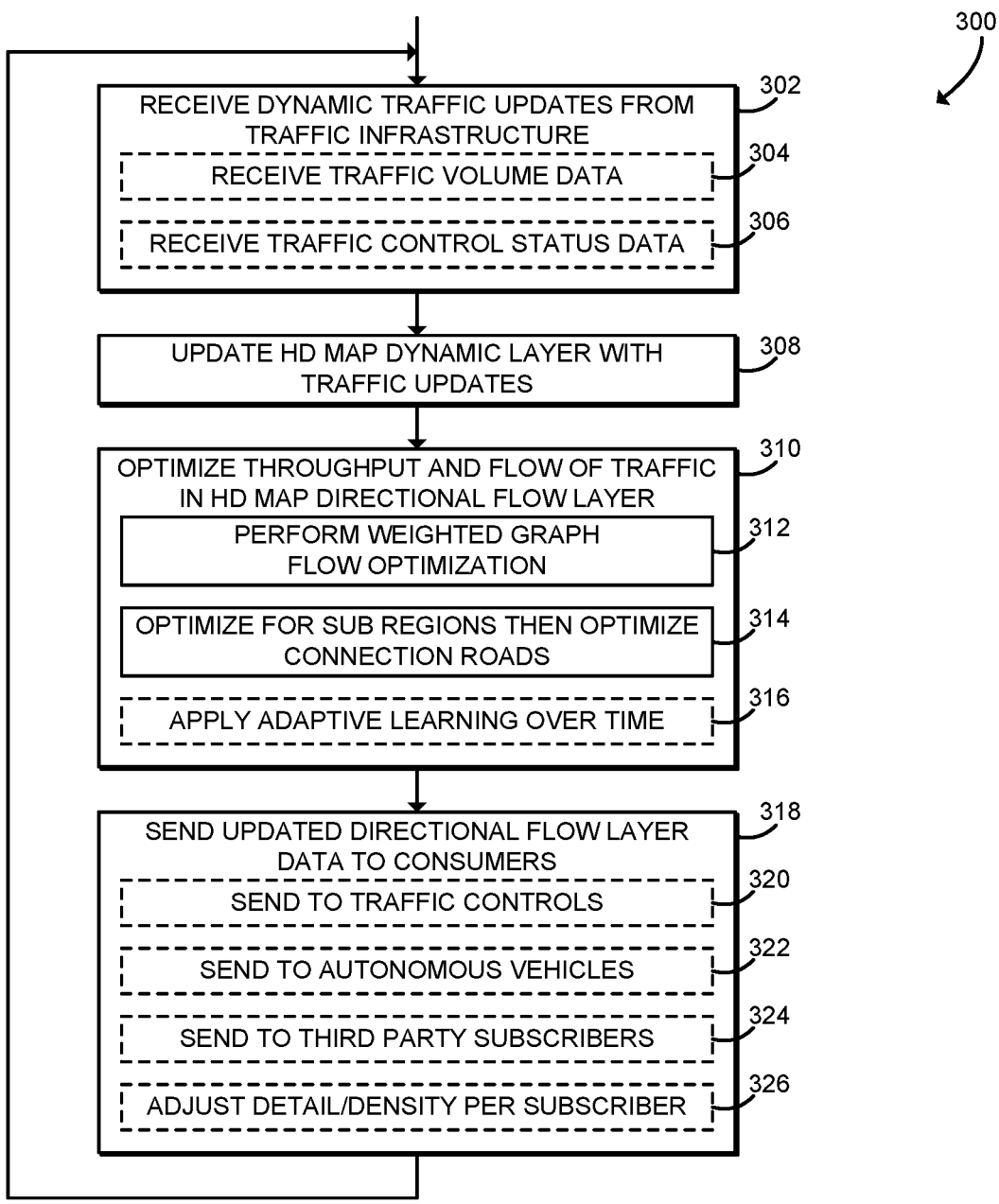
FIG. 3 is a simplified flow diagram of at least one embodiment of a method for intelligent traffic optimization that may be executed by the directional flow server of FIGS. 1-2.

Referring now to FIG. 3, in use, the directional flow server 102 may execute a method 300 for intelligent traffic optimization. It should be appreciated that, in some embodiments, the operations of the method 300 may be performed by one or more components of the environment 200 of the directional flow server 102 as shown in FIG. 2. The method 300 begins in block 302, in which the directional flow server 102 receives dynamic traffic updates from the traffic infrastructure 104. For example, the directional flow server 102 may subscribe to traffic update information from the traffic infrastructure 104, and the traffic infrastructure 104 devices may publish update information. The dynamic traffic update information may include any information related to the dynamic layer 212 of the HD maps 208, including information on current traffic volume and/or status. In some embodiments, in block 304 the directional flow server 102 may receive traffic volume data from one or more traffic sensors 108. The traffic volume data may indicate the number of vehicles on each road in the monitored region, the relative congestion of each road, or any other measure of traffic volume. In some embodiments, in block 306 the directional flow server 102 may receive traffic control status data from one or more traffic controls 106. The status data may indicate the current traffic direction for one or more lanes of traffic, for example by indicating the status of one or more lane control lights or other lane control devices. The status data may indicate the current status of one or more traffic lights (e.g., green, yellow, red) or otherwise indicate whether a traffic control 106 is allowing traffic to flow through a particular node (e.g., an intersection, access ramp, or other area in the monitored region). The status data may also indicate timing data associated with the traffic control 106, such as green light length, red light length, etc.

In block 308, the directional flow server 102 updates the HD map 208 dynamic layer 212 with the traffic updates received from the traffic infrastructure 104. The directional flow server 102 may, for example, update traffic volume and direction data for one or more nodes and/or edges stored in the HD map 208 based on the traffic update data. After updating, the dynamic layer 212 may represent real-time traffic conditions in the monitored region.

In block 310, the directional flow server 102 optimizes throughput and flow of traffic in the HD map 208 directional flow layer 210. In particular, optimizing the traffic flow includes finding the optimum direction of each traffic road at each time of day and automatically assigning the optimum timing to traffic assets like traffic lights (e.g., traffic controls 106) to minimize the sum of travel time for all vehicles on that region. In block 312, the directional flow server 102 models the traffic optimization problem as a weighted graph flow optimization problem. In block 314, the directional flow server 102 optimizes traffic flow for multiple sub-regions within the monitored region. The directional flow server 102 optimizes each sub-region with a fast algorithm such as A-start or D-Lite. After optimizing each sub-region, the result of those optimizations is fed into a Q-function to globally optimize the connection roads between the sub-region. In some embodiments, in block 316 the directional flow server 102 may apply an adaptive learning algorithm to optimize the overall network over time and expedite the calculation for bigger areas. The handling of the traffic and transition along the nodes can be processed using existing neural networks optimization.

In block 318, the directional flow server 102 sends the optimized directional flow layer 210 data to multiple consumers. In some embodiments, in block 320 the directional flow server 102 may send the optimized data to the traffic controls 106. The traffic controls 106 may modify their status or otherwise control the flow of traffic according to the optimized directional flow layer 210. By optimizing the direction and/or volume of each road in the monitored area, the system 100 may improve traffic efficiency for the monitored area.

In some embodiments, in block 322 the directional flow server 102 may send the optimized directional flow layer 210 data to the vehicles 110. The vehicles 110 may use the optimized data to control vehicle navigation in the monitored region (e.g., for autonomous or semi-autonomous vehicles), to perform route planning or to display traffic (e.g., for navigation systems or other in-vehicle infotainment functions), or for other purposes.

In some embodiments, in block 324 the directional flow server 102 may send the optimized directional flow layer 210 data to one or more other subscriber devices 112. For example, the directional flow server 102 may supply traffic-as-a-service information to subscribers such as local businesses (e.g., for business open hours planning, staffing planning, or otherwise planning around traffic conditions), advertisers (e.g., to activate smart billboards or to adjust billboard pricing models based on traffic direction or volume), or other subscribers. The directional flow layer 210 data may be distributed along with the HD map 208 data, emergency alerts, or other data or services. In some embodiments, in block 326 the directional flow server 102 may adjust the detail or density of the optimized directional flow layer 210 data based on the identity of the subscriber. For example, general traffic/direction information may be available to all vehicles 110. More details or otherwise more-advanced information (such as traffic projections) may be available to paying subscribers or other entities, such as emergency services. After distributing the optimized data, the method 300 loops back to block 302 to continue updating the HD map 208 and optimizing the directional flow layer 210.

Figure 4:
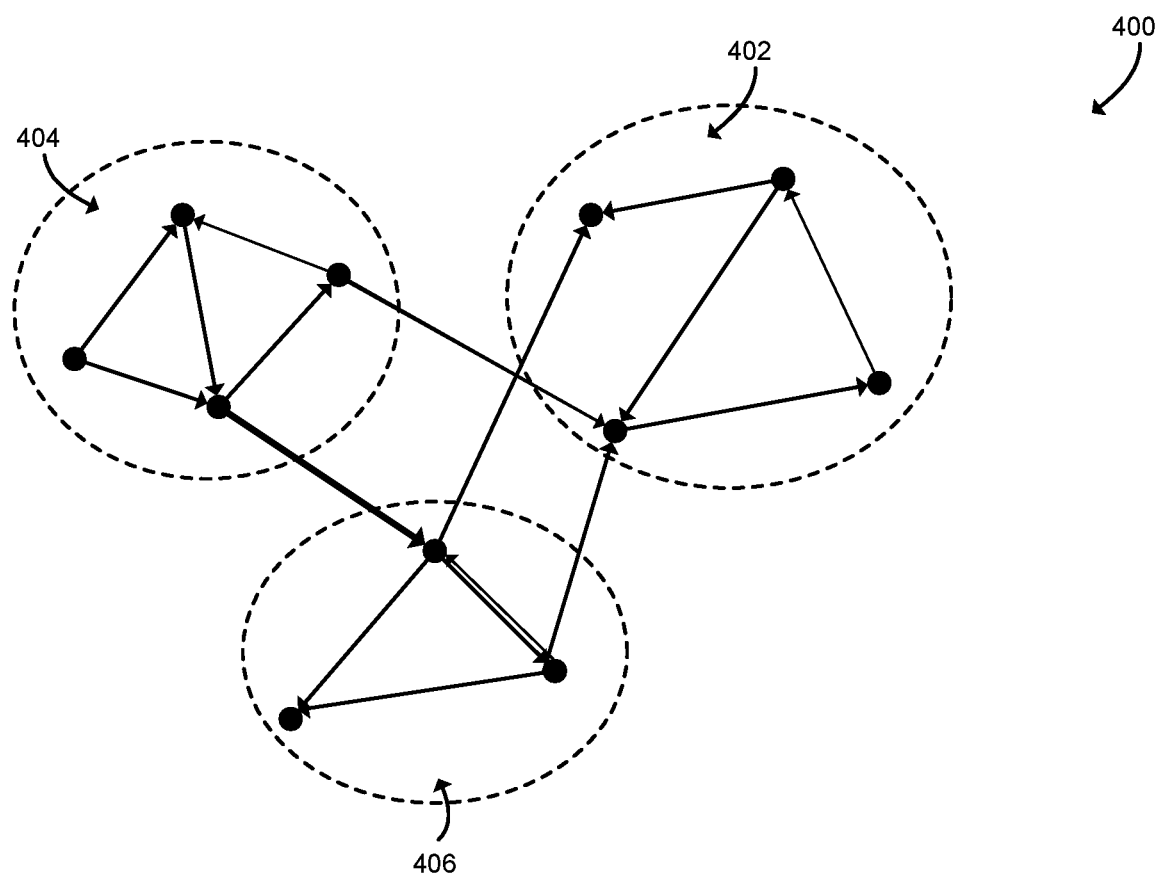
FIG. 4 is a schematic diagram of a directional flow layer that may be optimized by the directional flow server of FIGS. 1-2.

Referring now to FIG. 4, diagram 400 illustrates one potential embodiment of a directional flow layer 210 that may be optimized by the directional flow server 102. The directional flow layer 210 is illustrated as a directional graph including multiple nodes connected by weighted edges. Each node corresponds to an area in the monitored region, such as an intersection, access ramp, or other location. Each edge corresponds to a road or other connection between nodes. Each edge is weighted by current traffic volume. Illustratively, in the graph 400 heavier weight lines are used to illustrate heavier traffic. As shown, the graph 400 is divided into sub-regions 402, 404, 406. As described above, traffic flow in each sub-region 402, 404, 406 may be individually optimized using a fast algorithm. After optimization, the connecting roads (e.g., the road between nodes in sub-regions 402, 404, the roads between nodes in sub-regions 402, 406, etc.) are globally optimized. The optimized directional flow layer 210 is then distributed to consumers such as traffic controls 106 and vehicles 110.

Figure 5:
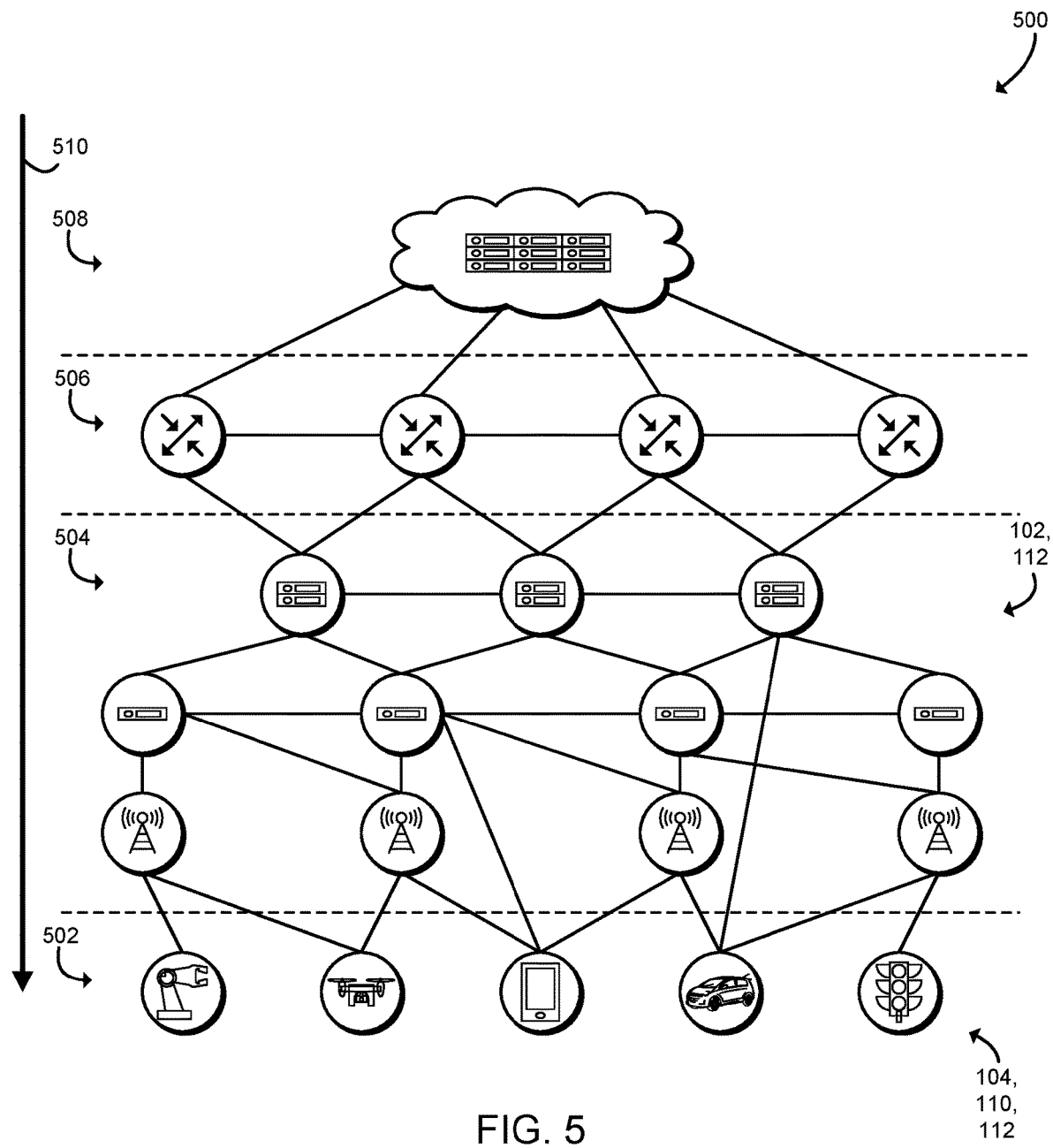
FIG. 5 is a simplified block diagram of at least one embodiment of an edge architecture that may include the system of FIGS. 1-4.

Referring now to FIG. 5, diagram 500 shows an edge architecture that may include the system 100. As shown, the edge architecture includes multiple tiers 502, 504, 506, 508. Each tier includes multiple nodes that may communicate via an edge fabric to other nodes of the same tier and/or nodes at other tiers. As shown, the traffic infrastructure 104, vehicles 110, and/or subscriber devices 112 may be included in the things/endpoint tier 502. The things/endpoint tier 502 may include large numbers of endpoint devices that are heterogeneous, may be mobile, and are widely distributed geographically. The access/edge tier 504 may include access network components such as wireless towers, access points, base stations, intermediate nodes, gateways, fog nodes, central offices, and other access network or edge components. Components of the access/edge tier 504 may be distributed at the building, small cell, neighborhood, or cell scale. Thus, components of the access/edge tier 504 may be relatively close in physical proximity to components of the things/endpoint tier 502. The core network tier 506 may include core network routers, network gateways, servers, and other more-centralized computing devices. Components of the core network tier 506 may be distributed regionally or nationally. The cloud/Internet tier 508 may include Internet backbone routers, cloud service providers, datacenters, and other cloud resources. The components of the cloud/Internet tier 508 may be distributed globally. As shown, the directional flow server 102 and/or the subscriber devices 112 may be included in all of the access/edge tier 504, the core network tier 506, and/or the cloud/Internet tier 508.

As shown, the edge architecture is organized according to a logical gradient 510 from global, cloud-based components toward local, endpoint devices. Components that are closer to the network edge (i.e., closer to the endpoint tier 502) may be smaller but more numerous, with fewer processing resources and lower power consumption, as compared to components that are closer to the network core (i.e., closer to the cloud/Internet tier 508). However, network communications among components closer to the network edge may be faster and/or have lower latency as compared to communications that traverse through tiers closer to the network core. The same logical gradient 510 may apply to components within a tier. For example, the access/edge tier 504 may include numerous, widely spread base stations, street cabinets, and other access nodes as well as less-numerous but more sophisticated central offices or other aggregation nodes. Thus, by including intelligent traffic optimization in the access/edge tier 504 or other components close to the network edge (e.g., logically close to the traffic infrastructure 104 and/or the vehicles 110), the system 100 may improve latency and performance as compared to traditional cloud-computing based FaaS architectures.

In addition to the mobile edge computing implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart city, the above systems and methods may improve the accuracy, efficiency, and/or safety in the operation of traffic control systems, environmental monitoring systems, and/or other automated or semi-automated systems.

EXAMPLES

Illustrative examples of the technologies disclosed herein are provided below. An embodiment of the technologies may include any one or more, and any combination of, the examples described below.

Example 1 includes a computing device for traffic flow control, the computing device comprising: a dynamic layer manager to (i) receive dynamic traffic data from a plurality of traffic infrastructure devices from a monitored region and (ii) update a dynamic layer of a high definition map based on the dynamic traffic data, wherein the high definition map comprises a static layer, a dynamic layer, and a directional flow layer; and a flow optimizer to optimize the directional flow layer of the high definition map in response to an update of the dynamic layer, wherein the directional flow layer is indicative of a direction associated with one or more roads of the monitored region.

Example 2 includes the subject matter of Example 1, and further comprising a distribution manager to send the directional flow layer to a plurality of consumer computing devices in response to optimization of the directional flow layer.

Example 3 includes the subject matter of any of Examples 1 and 2, and wherein to send the directional flow layer to the plurality of consumer computing devices comprises to send the directional flow layer to an autonomous vehicle.

Example 4 includes the subject matter of any of Examples 1-3, and wherein to send the directional flow layer to the plurality of consumer computing devices comprises to send the directional flow layer to a traffic control device.

Example 5 includes the subject matter of any of Examples 1-4, and wherein to send the directional flow layer to the plurality of consumer computing devices comprises to send the directional flow layer to a subscriber device.

Example 6 includes the subject matter of any of Examples 1-5, and wherein to send the directional flow layer to the plurality of consumer computing devices comprises to adjust a detail level of the directional flow layer based on an identity associated with the subscriber device.

Example 7 includes the subject matter of any of Examples 1-6, and wherein to receive the dynamic traffic data comprises to receive traffic volume data from a plurality of traffic sensors.

Example 8 includes the subject matter of any of Examples 1-7, and wherein to receive the dynamic traffic data comprises to receive traffic control status data from a plurality of traffic control devices.

Example 9 includes the subject matter of any of Examples 1-8, and wherein to optimize the directional flow layer comprises to perform a weighted graph flow optimization algorithm.

Example 10 includes the subject matter of any of Examples 1-9, and wherein to optimize the directional flow layer comprises to: optimize a plurality of directional flow sublayers, wherein each directional flow sublayer is associated with a sub-region of the monitored region; and optimize connection roads between each of the plurality of sub-regions in response to optimization of the plurality of directional flow sublayers.

Example 11 includes a method for traffic flow control, the method comprising: receiving, by a computing device, dynamic traffic data from a plurality of traffic infrastructure devices from a monitored region; updating, by the computing device, a dynamic layer of a high definition map based on the dynamic traffic data, wherein the high definition map comprises a static layer, a dynamic layer, and a directional flow layer; and optimizing, by the computing device, the directional flow layer of the high definition map in response to updating the dynamic layer, wherein the directional flow layer is indicative of a direction associated with one or more roads of the monitored region.

Example 12 includes the subject matter of Example 11, and further comprising sending, by the computing device, the directional flow layer to a plurality of consumer computing devices in response to optimizing the directional flow layer.

Example 13 includes the subject matter of any of Examples 11 and 12, and wherein sending the directional flow layer to the plurality of consumer computing devices comprises sending the directional flow layer to an autonomous vehicle.

Example 14 includes the subject matter of any of Examples 11-13, and wherein sending the directional flow layer to the plurality of consumer computing devices comprises sending the directional flow layer to a traffic control device.

Example 15 includes the subject matter of any of Examples 11-14, and wherein sending the directional flow layer to the plurality of consumer computing devices comprises sending the directional flow layer to a subscriber device.

Example 16 includes the subject matter of any of Examples 11-15, and wherein sending the directional flow layer to the plurality of consumer computing devices comprises adjusting a detail level of the directional flow layer based on an identity associated with the subscriber device.

Example 17 includes the subject matter of any of Examples 11-16, and wherein receiving the dynamic traffic data comprises receiving traffic volume data from a plurality of traffic sensors.

Example 18 includes the subject matter of any of Examples 11-17, and wherein receiving the dynamic traffic data comprises receiving traffic control status data from a plurality of traffic control devices.

Example 19 includes the subject matter of any of Examples 11-18, and wherein optimizing the directional flow layer comprises performing a weighted graph flow optimization algorithm.

Example 20 includes the subject matter of any of Examples 11-19, and wherein optimizing the directional flow layer comprises: optimizing a plurality of directional flow sublayers, wherein each directional flow sublayer is associated with a sub-region of the monitored region; and optimizing connection roads between each of the plurality of sub-regions in response to optimizing the plurality of directional flow sublayers.

Example 21 includes a computing device comprising: a processor; and a memory having stored therein a plurality of instructions that when executed by the processor cause the computing device to perform the method of any of Examples 11-20.

Example 22 includes one or more non-transitory, computer readable storage media comprising a plurality of instructions stored thereon that in response to being executed result in a computing device performing the method of any of Examples 11-20.

Example 23 includes a computing device comprising means for performing the method of any of Examples 11-20.

The invention claimed is:

1. A computing device for traffic flow control, the computing device comprising:
    a dynamic layer manager comprising circuitry to (i) receive dynamic traffic data from a plurality of traffic infrastructure devices from a monitored region and (ii) update a dynamic layer of a high definition map based on the dynamic traffic data, wherein the high definition map comprises a static layer, a dynamic layer, and a directional flow layer;
    a flow optimizer comprising circuitry to optimize the directional flow layer of the high definition map in response to an update of the dynamic layer, wherein the directional flow layer is indicative of a direction associated with one or more roads of the monitored region; and
    a distribution manager comprising circuitry to send the optimized directional flow layer to a plurality of consumer computing devices.

2. The computing device of claim 1, wherein to send the directional flow layer to the plurality of consumer computing devices comprises to send the directional flow layer to an autonomous vehicle.

3. The computing device of claim 1, wherein to send the directional flow layer to the plurality of consumer computing devices comprises to send the directional flow layer to a traffic control device.

4. The computing device of claim 1, wherein to send the directional flow layer to the plurality of consumer computing devices comprises to send the directional flow layer to a subscriber device.

5. The computing device of claim 4, wherein to send the directional flow layer to the plurality of consumer computing devices comprises to adjust a detail level of the directional flow layer based on an identity associated with the subscriber device.

6. The computing device of claim 1, wherein to receive the dynamic traffic data comprises to receive traffic volume data from a plurality of traffic sensors.

7. The computing device of claim 1, wherein to receive the dynamic traffic data comprises to receive traffic control status data from a plurality of traffic control devices.

8. The computing device of claim 1, wherein to optimize the directional flow layer comprises to perform a weighted graph flow optimization algorithm.

9. The computing device of claim 1, wherein to optimize the directional flow layer comprises to:
    optimize a plurality of directional flow sublayers, wherein each directional flow sublayer is associated with a sub-region of the monitored region; and
    optimize connection roads between each of the plurality of sub-regions in response to optimization of the plurality of directional flow sublayers.

10. A method for traffic flow control, the method comprising:
    receiving, by a computing device, dynamic traffic data from a plurality of traffic infrastructure devices from a monitored region;
    updating, by the computing device, a dynamic layer of a high definition map based on the dynamic traffic data, wherein the high definition map comprises a static layer, a dynamic layer, and a directional flow layer;
    optimizing, by the computing device, the directional flow layer of the high definition map in response to updating the dynamic layer, wherein the directional flow layer is indicative of a direction associated with one or more roads of the monitored region; and
    sending, by the computing device, the optimized directional flow layer to a plurality of consumer computing devices.

11. The method of claim 10, wherein sending the directional flow layer to the plurality of consumer computing devices comprises sending the directional flow layer to an autonomous vehicle.

12. The method of claim 10, wherein sending the directional flow layer to the plurality of consumer computing devices comprises sending the directional flow layer to a traffic control device.

13. The method of claim 10, wherein receiving the dynamic traffic data comprises receiving traffic volume data from a plurality of traffic sensors.

14. The method of claim 10, wherein optimizing the directional flow layer comprises performing a weighted graph flow optimization algorithm.

15. The method of claim 10, wherein optimizing the directional flow layer comprises:
    optimizing a plurality of directional flow sublayers, wherein each directional flow sublayer is associated with a sub-region of the monitored region; and
    optimizing connection roads between each of the plurality of sub-regions in response to optimizing the plurality of directional flow sublayers.

16. One or more non-transitory computer-readable storage media comprising a plurality of instructions stored thereon that, in response to being executed, cause a computing device to:
    receive dynamic traffic data from a plurality of traffic infrastructure devices from a monitored region;
    update a dynamic layer of a high definition map based on the dynamic traffic data, wherein the high definition map comprises a static layer, a dynamic layer, and a directional flow layer;
    optimize the directional flow layer of the high definition map in response to updating the dynamic layer, wherein the directional flow layer is indicative of a direction associated with one or more roads of the monitored region; and cause the optimized directional flow layer to be sent to a plurality of consumer computing devices.

17. The one or more computer-readable storage media of claim 16, wherein to send the directional flow layer to the plurality of consumer computing devices comprises to send the directional flow layer to an autonomous vehicle.

18. The one or more computer-readable storage media of claim 16, wherein to send the directional flow layer to the plurality of consumer computing devices comprises to send the directional flow layer to a traffic control device.

19. The one or more computer-readable storage media of claim 16, wherein to receive the dynamic traffic data comprises to receive traffic volume data from a plurality of traffic sensors.

20. The one or more computer-readable storage media of claim 16, wherein to receive the dynamic traffic data comprises to receive traffic control status data from a plurality of traffic control devices.

21. The one or more computer-readable storage media of claim 16, wherein to optimize the directional flow layer comprises to perform a weighted graph flow optimization algorithm.

22. The one or more computer-readable storage media of claim 16, wherein to optimize the directional flow layer comprises to:

optimize a plurality of directional flow sublayers, wherein each directional flow sublayer is associated with a sub-region of the monitored region; and optimize connection roads between each of the plurality of sub-regions in response to optimizing the plurality of directional flow sublayers.

23. The computing device of claim 1, wherein to optimize the directional flow layer comprises determining an optimum direction of the one or more roads of the monitored region and optimum timings for a plurality of traffic control devices of the monitored region to minimize a sum of travel time for all vehicles in the monitored region.

24. The method of claim 10, optimizing the directional flow layer comprises determining an optimum direction of the one or more roads of the monitored region and optimum timings for a plurality of traffic control devices of the monitored region to minimize a sum of travel time for all vehicles in the monitored region.

25. The one or more computer-readable storage media of claim 16, wherein to optimize the directional flow layer comprises determining an optimum direction of the one or more roads of the monitored region and optimum timings for a plurality of traffic control devices of the monitored region to minimize a sum of travel time for all vehicles in the monitored region.

* * * * *